US009268684B2

(12) United States Patent
Dean et al.

(10) Patent No.: US 9,268,684 B2
(45) Date of Patent: Feb. 23, 2016

(54) POPULATING LOCALIZED FAST BULK STORAGE IN A MULTI-NODE COMPUTER SYSTEM

(71) Applicant: Silicon Graphics International Corp., Fremont, CA (US)

(72) Inventors: Steven Dean, Chippewa Falls, WI (US); David R. Collins, Eau Claire, WI (US); Paul Kinyon, San Jose, CA (US)

(73) Assignee: Silicon Graphics International Corp., Milpitas, CA (US)

( * ) Notice: Subject to any disclaimer, the term of this patent is extended or adjusted under 35 U.S.C. 154(b) by 125 days.

(21) Appl. No.: 13/931,870

(22) Filed: Jun. 29, 2013

(65) Prior Publication Data

US 2014/0297923 A1      Oct. 2, 2014

Related U.S. Application Data

(60) Provisional application No. 61/806,716, filed on Mar. 29, 2013.

(51) Int. Cl.
| G06F 13/00 | (2006.01) |
| G06F 13/28 | (2006.01) |
| G06F 12/02 | (2006.01) |
| G06F 3/06 | (2006.01) |
| G06F 11/20 | (2006.01) |

(52) U.S. Cl.
CPC .......... *G06F 12/0246* (2013.01); *G06F 3/0635* (2013.01); *G06F 11/2084* (2013.01); *G06F 11/201* (2013.01); *G06F 11/2002* (2013.01); *G06F 11/2007* (2013.01); *G06F 11/2089* (2013.01)

(58) Field of Classification Search
CPC .......................... G06F 11/2084; H05K 7/1489
See application file for complete search history.

(56) References Cited

U.S. PATENT DOCUMENTS

| 6,325,636 | B1 | 12/2001 | Hipp et al. ..................... 439/61 |
| 2006/0098406 | A1* | 5/2006 | Niigata ......................... 361/685 |
| 2008/0144293 | A1 | 6/2008 | Aksamit et al. ............... 361/727 |
| 2008/0310097 | A1 | 12/2008 | Sherrod et al. ................ 361/686 |

(Continued)

OTHER PUBLICATIONS

Liu et al., "On the Role of Burst Buffers in Leadership-Class Storage Systems," *IEEE, MSST/SNAPI* 2012, 11 pages, Apr. 16-20, 2012.

(Continued)

*Primary Examiner* — Eric S Cardwell
(74) *Attorney, Agent, or Firm* — Sunstein Kann Murphy & Timbers LLP

(57) ABSTRACT

A high performance computing (HPC) system includes computing blades having a first region that includes processors for performing a computation, and a second region that includes non-volatile memory for use in performing the computation and another computing processor for performing data movement and storage. Because data movement and storage are offloaded to the secondary processor, the processors for performing the computation are not interrupted to perform these tasks. A method for use in the HPC system receives instructions in the computing processors and first data in the memory. The method includes receiving second data into the memory while continuing to execute the instructions in the computing processors, without interruption. A computer program product implementing the method is also disclosed.

23 Claims, 14 Drawing Sheets

(56) References Cited

U.S. PATENT DOCUMENTS

2012/0079174 A1 3/2012 Nellans et al. ............... 711/103
2013/0304775 A1* 11/2013 Davis et al. ................... 707/827

OTHER PUBLICATIONS

Subramoni, H., et al., "A Scalable InfiniBand Network Topology—Aware Performance Analysis Tool for MPI," *International Workshop on Productivity and Performance (Proper '12)*, held in conjunction with EuroPar, Aug. 27-31, 2012, 39 pages.

Subramoni, H., et al., "A Scalable InfiniBand Network Topology—Aware Performance Analysis Tool for MPI*," *Lecture Notes in Computer Science*, vol. 7640, pp. 439-450, 2013.

International Searching Authority, International Search Report—International Application No. PCT/US2014/031003, dated Sep. 24, 2014, together with the Written Opinion of the International Searching Authority, 8 pages.

International Searching Authority, International Search Report—International Application No. PCT/US2014/030983, dated Sep. 16, 2014, together with the Written Opinion of the International Searching Authority, 9 pages.

* cited by examiner

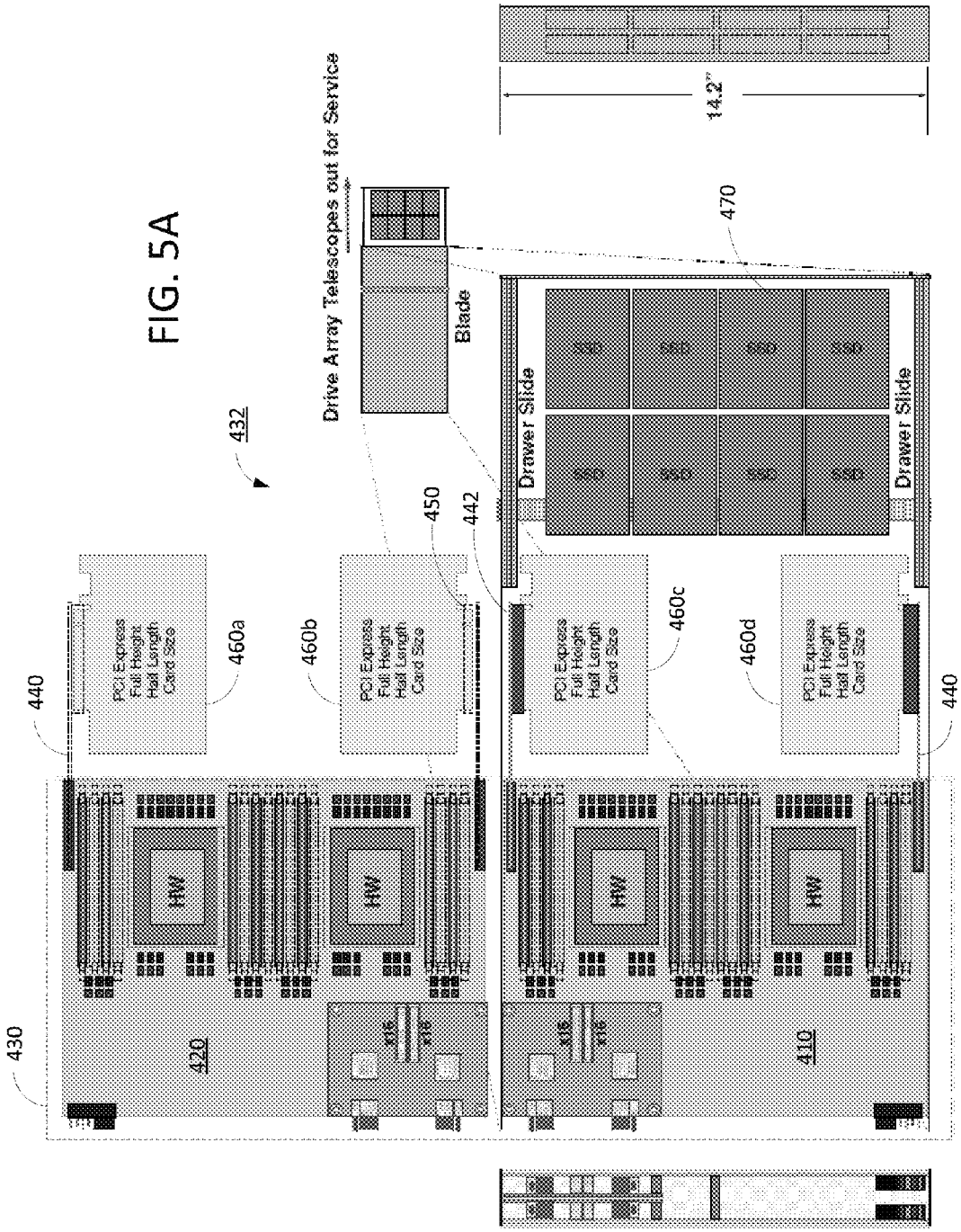

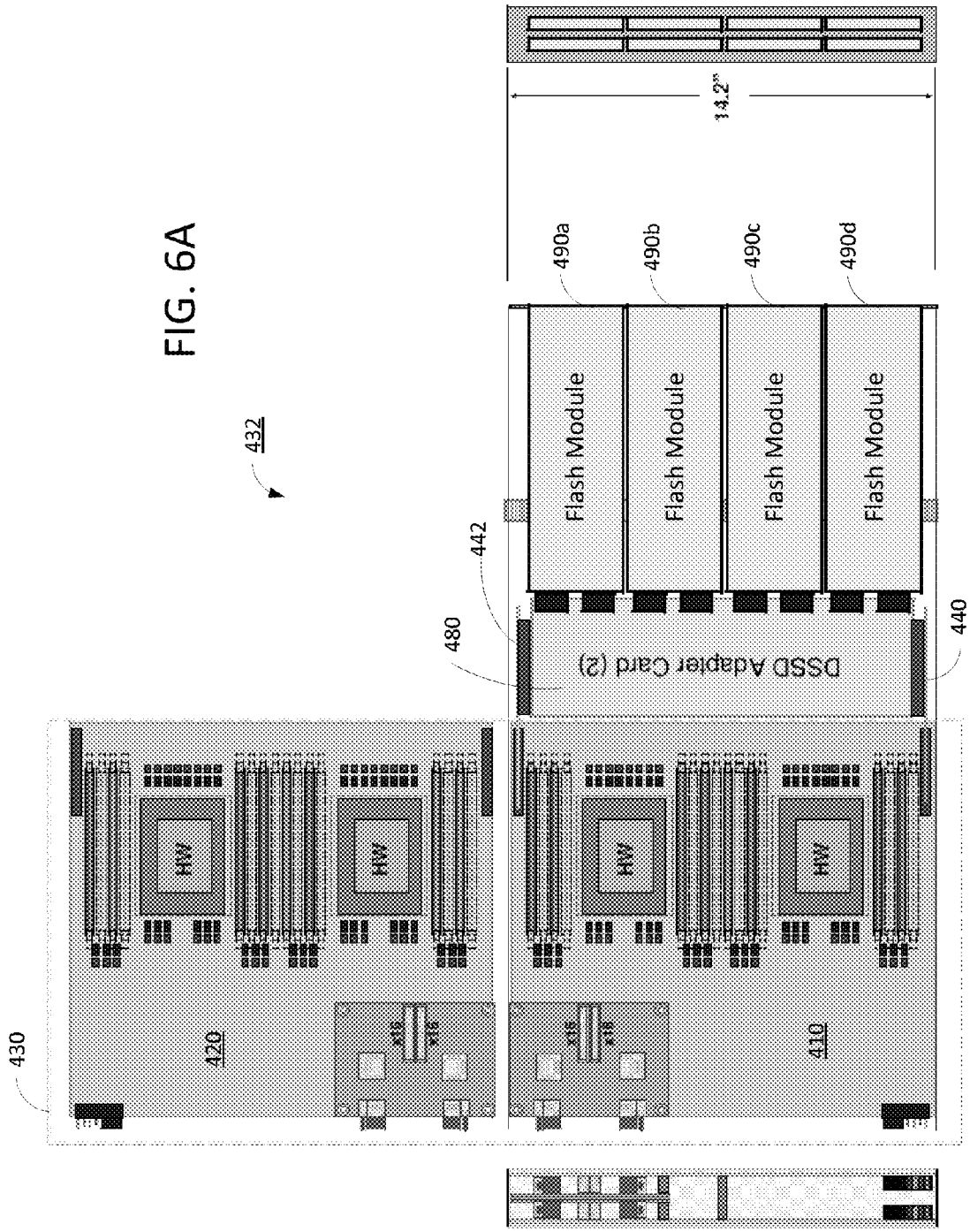

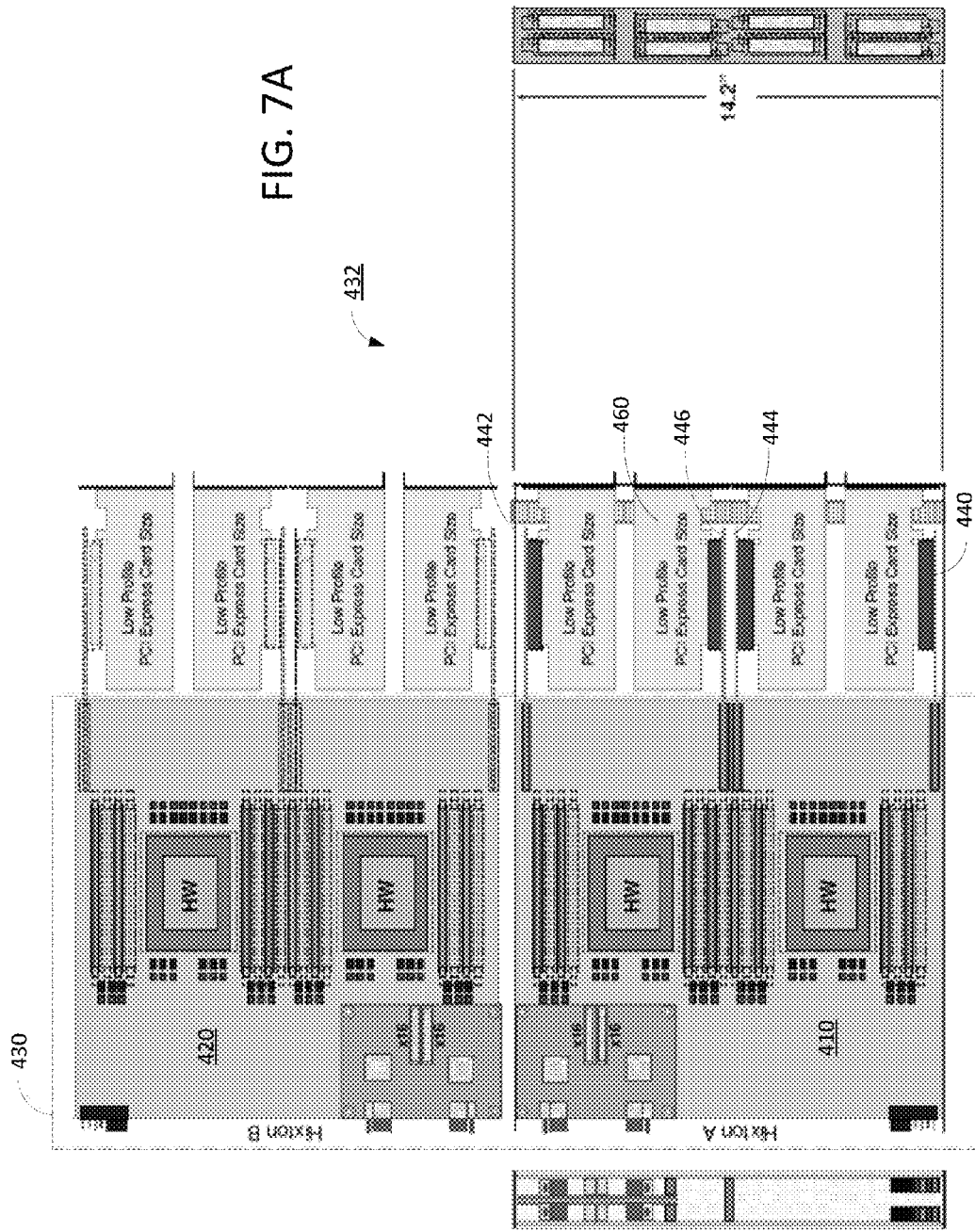

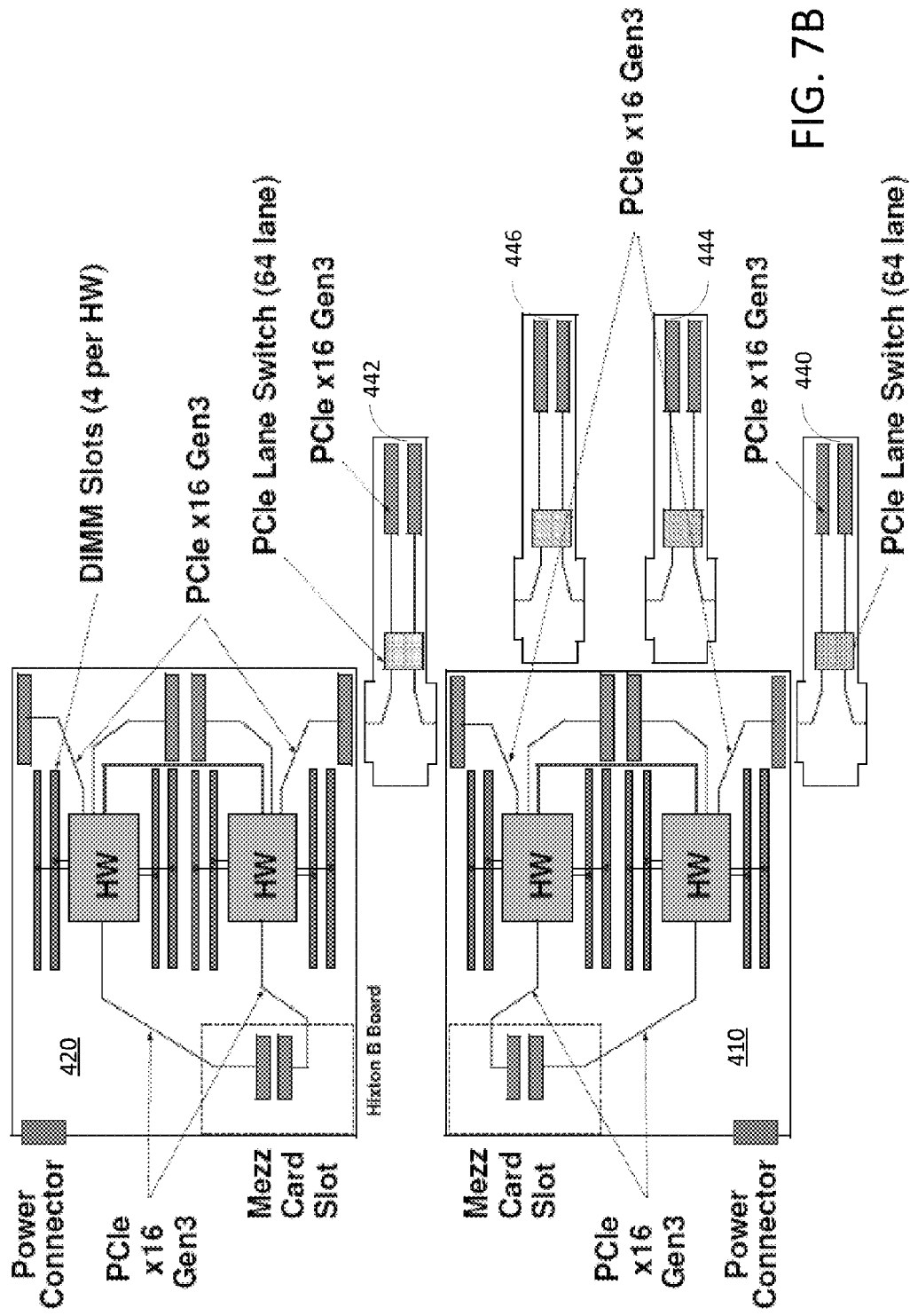

POPULATING LOCALIZED FAST BULK STORAGE IN A MULTI-NODE COMPUTER SYSTEM

CROSS-REFERENCE TO RELATED APPLICATION

This application claims the benefit of U.S. Provisional Application No. 61/806,716, filed Mar. 29, 2013, the contents of which are incorporated herein by reference in their entirety.

FIELD OF THE INVENTION

The invention generally relates to storage accessing and control in a multi-node computer system and, more particularly, the invention relates to populating bulk removable solid state storage by computing nodes without interrupting the computational operations of the nodes.

BACKGROUND OF THE INVENTION

As high performance computing ("HPC") systems have gotten more powerful, they have been increasingly used for computations based on rigidly defined mathematical models. For example, a weather simulation may be based on a series of equations having an exact mathematical representation, as might a finite element analysis for determining heat flow around the leading edge of an airplane wing or stresses in a bar of steel. These simulations generate synthetic data; that is, data based not on reality, but based on the mathematical model of reality used to define the bounds of the simulation. The worth of such models may be judged by how closely their computed results are demonstrated in reality (e.g., by observing the weather, or building an airplane wing or a bar of steel and testing it in a laboratory).

However, such models generally are incapable of processing data that derive from real measurement instruments (e.g. anemometers, thermometers, torsion gauges and the like). As these instruments have developed in complexity and efficiency, the amount of data that they generate has multiplied greatly. The size and location of these volumes of data as they are being generated are going to stress global infrastructures, and the cost of simply moving or storing data will become a significant issue in the future. More "real world" data than ever before are available for analysis in the development of scientific models, and as technology improves the quantity of data surely will continue to increase. Real data are more useful to analyze than simulated or synthetic data, but the HPC systems of today are largely optimized for heavy computation, and are not capable of quickly accessing the vast amounts of real data that measurement instruments can generate.

Some leading-edge measurement instruments like the Square Kilometer Array telescope will be able to produce raw data at speeds of up to 1000 petabytes (1 billion gigabytes) per day. This data must be sorted, filtered, and analyzed. While it is conceptually possible to filter these data to only 0.1% of their raw size (i.e., to 1 petabyte per day) for analysis, remote processing still is likely to be problematic. One petabyte per day is about 12.13 gigabytes per second on average (more during bursts), a channel capacity that is greater than long-haul systems like the Internet can handle. Because the data cannot be sent elsewhere for processing, rapid local access to bulk data is therefore needed in HPC systems.

SUMMARY OF VARIOUS EMBODIMENTS

Various embodiments of the invention provide a high performance computing ("HPC") system with computing blades that provide an extension space that includes bulk storage, and methods for moving data into and out of this space and storing the data. The bulk storage may use solid state devices, such as flash memory, and unused data transfer capacity to provide low access latency and high transfer rates. Multiple computing boards within a blade may cooperate to provide fault-tolerant power to the extension space. The bulk storage may be mounted in the extension space using a drawer for easy physical access and replacement as more raw data become available.

The computing blades having a first region that includes processors for performing a computation, and a second region that includes non-volatile memory for use in performing the computation and another computing processor for performing data movement and storage. Because data movement and storage are offloaded to the secondary processor, the processors for performing the computation are not interrupted to perform these tasks. A method for use in the HPC system receives instructions in the computing processors and first data in the memory. The method includes receiving second data into the memory while continuing to execute the instructions in the computing processors, without interruption.

Therefore, a first embodiment of the invention is an HPC system having a plurality of computing blades that each have at least one computing processor, wherein a plurality of the computing processors in the HPC system are configured to cooperate to perform a computation. At least one given computing blade has a housing having a first region and a second region. The first region has a first computing processor that is used in performing the computation. The second region has: a non-volatile memory containing data for use in performing the computation, a first data connector that is coupled to a data network external to the given computing blade, and a second computing processor, coupled to the first data connector and to the non-volatile memory. The blade also has a second data connector that conveys the data for use in performing the computation between the first region and the second region. The second computing processor is configured to convey data, using the first data connector, between the data network and the non-volatile memory, without interrupting the performing of the computation by the first computing processor in the first region.

Several variations are contemplated. The given computing blade may further include a plurality of power connectors that redundantly convey power from the first region to the second region. Alternately or in addition, the given computing blade may include not just one, but a plurality of second data connectors that redundantly convey data between the first region and the second region. The second region of the housing may include a telescoping drawer that facilitates service access to the second region. The non-volatile memory may be solid state memory. The data connectors may comprise a riser circuit board, and may implement an expansion bus standard such as PCI Express. The second computing processor may implement a RAID using the non-volatile memory.

In accordance with another embodiment of the invention, a method of performing a computation in the HPC system is disclosed. The method includes receiving a series of instructions, that comprise a portion of the computation, in a plurality of computing processors located in a first region of a given computing blade. Next, the method requires receiving first data in a non-volatile memory located in a second region of the given computing blade, the non-volatile memory being coupled to the plurality of computing processors in the first region using a plurality of data connectors. Then, the method calls for the plurality of computing processors performing the computation by execution of the series of instructions using the first data. Finally, the method concludes by continuing to execute, without interruption, the series of instructions using the first data while simultaneously receiving second data into the non-volatile memory from a data network external to the given computing blade.

This method may be varied in the same way as discussed above in the context of the system embodiment. Moreover, there is contemplated a tangible, computer-readable medium in which is non-transitorily stored computer program code for performing the method and its variations.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 5A shows an unfolded plan view of the hardware of the two circuit boards of FIG. 4, where the extension space is configured according to one embodiment of the invention.

FIG. 6A shows an unfolded plan view of the hardware of the two circuit boards of FIG. 4, where the extension space is configured according to a second embodiment of the invention.

FIG. 7A shows an unfolded plan view of the hardware of the two circuit boards of FIG. 4, where the extension space is configured according to a third embodiment of the invention.

FIG. 7B shows the power and data connections of FIG. 7A.

DESCRIPTION OF ILLUSTRATIVE EMBODIMENTS

In illustrative embodiments, a high performance computing ("HPC") system has computing blades that provide an extension space that includes bulk storage. The bulk storage may use solid state devices, such as flash memory, and unused data transfer capacity to provide low access latency and high transfer rates. Multiple computing boards within a blade may cooperate to provide fault-tolerant power to the extension space. The bulk storage may be mounted in the extension space using a drawer for easy physical access and replacement as more raw data become available. Details of illustrative embodiments are discussed below.

System Architecture

Figure 1:
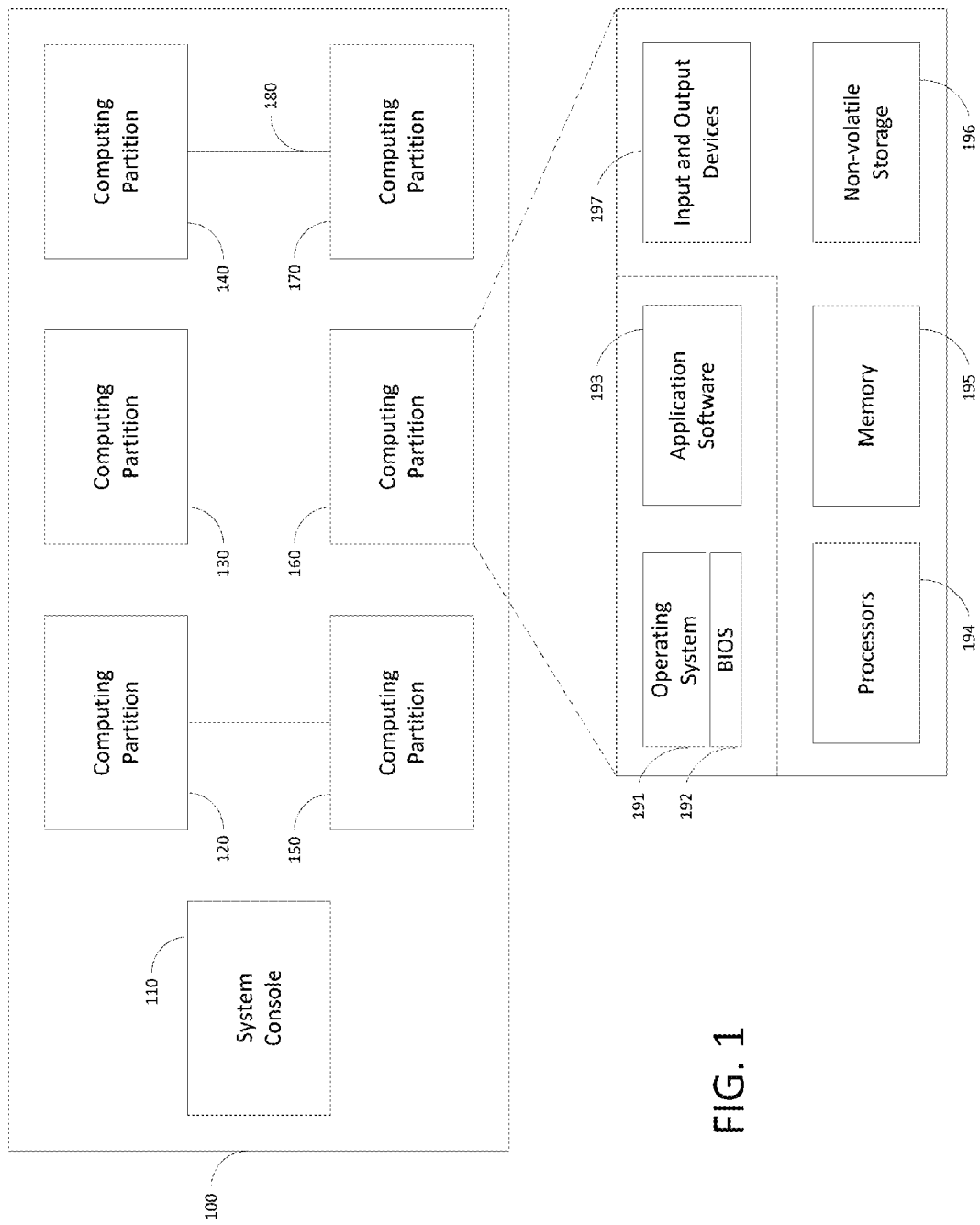
FIG. 1 schematically shows a logical view of an HPC system in accordance with one embodiment of the present invention.

FIG. 1 schematically shows a logical view of an exemplary high-performance computing system 100 that may be used with illustrative embodiments of the present invention. Specifically, as known by those in the art, a "high-performance computing system," or "HPC system," is a computing system having a plurality of modular computing resources that are tightly coupled using hardware interconnects, so that processors may access remote data directly using a common memory address space.

The HPC system 100 includes a number of logical computing partitions 120, 130, 140, 150, 160, 170 for providing computational resources, and a system console 110 for managing the plurality of partitions 120-170. A "computing partition" (or "partition") in an HPC system is an administrative allocation of computational resources that runs a single operating system instance and has a common memory address space. Partitions 120-170 may communicate with the system console 110 using a logical communication network 180. A system user, such as a scientist or engineer who desires to perform a calculation, may request computational resources from a system operator, who uses the system console 110 to allocate and manage those resources. Allocation of computational resources to partitions is described below. The HPC system 100 may have any number of computing partitions that are administratively assigned as described in more detail below, and often has only one partition that encompasses all of the available computing resources. Accordingly, this figure should not be seen as limiting the scope of the invention.

Each computing partition, such as partition 160, may be viewed logically as if it were a single computing device, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 1, a computing partition has various hardware allocated to it by a system operator, including one or more processors 194, volatile memory 195, non-volatile storage 196, and input and output ("I/O") devices 197 (e.g., network cards, video display devices, keyboards, and the like). However, in HPC systems like the embodiment in FIG. 1, each computing partition has a great deal more processing power and memory than a typical desktop computer. The OS software may include, for example, a Windows® operating system by Microsoft Corporation of Redmond, Wash., or a Linux operating system. Moreover, although the BIOS may be provided as firmware by a hardware manufacturer, such as Intel Corporation of Santa Clara, Calif., it is typically customized according to the needs of the HPC system designer to support high-performance computing, as described below in more detail.

As part of its system management role, the system console 110 acts as an interface between the computing capabilities of the computing partitions 120-170 and the system operator or other computing systems. To that end, the system console 110 issues commands to the HPC system hardware and software on behalf of the system operator that permit, among other things: 1) booting the hardware, 2) dividing the system computing resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 100. These particular functions are described in more detail in the section below entitled "System Operation."

Figure 2:
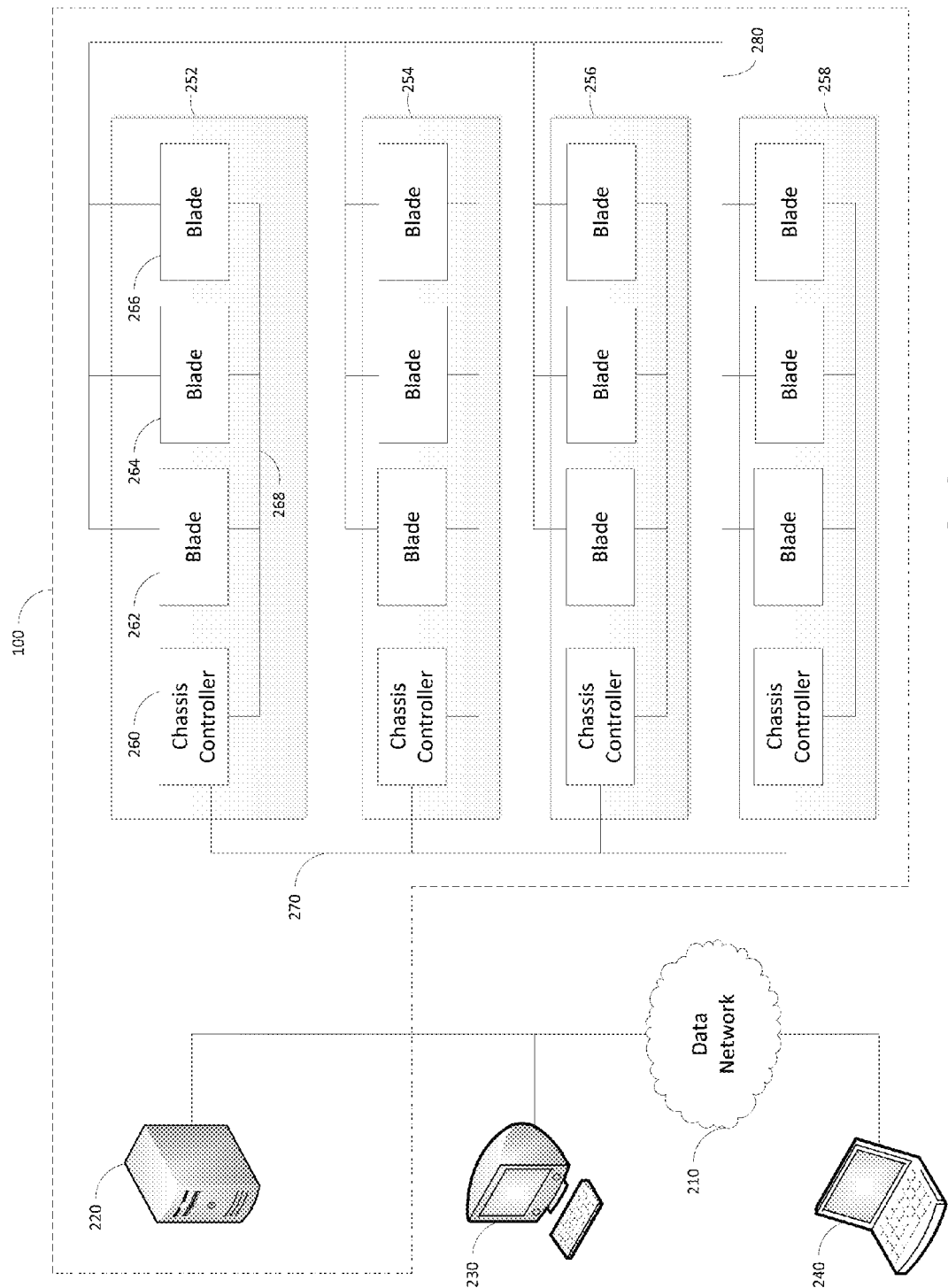
FIG. 2 schematically shows a physical view of the HPC system of FIG. 1.

FIG. 2 schematically shows a physical view of a high performance computing system 100 in accordance with the embodiment of FIG. 1. The hardware that comprises the HPC system 100 of FIG. 1 is surrounded by the dashed line. The HPC system 100 is connected to a enterprise data network 210 to facilitate user access.

The HPC system 100 includes a system management node ("SMN") 220 that performs the functions of the system console 110. The management node 220 may be implemented as a desktop computer, a server computer, or other similar computing device, provided either by the enterprise or the HPC system designer, and includes software necessary to control the HPC system 100 (i.e., the system console software).

The HPC system 100 is accessible using the data network 210, which may include any data network known in the art, such as an enterprise local area network ("LAN"), a virtual private network ("VPN"), the Internet, or the like, or a combination of these networks. Any of these networks may permit a number of users to access the HPC system resources remotely and/or simultaneously. For example, the management node 220 may be accessed by an enterprise computer 230 by way of remote login using tools known in the art such as Windows® Remote Desktop Services or the Unix secure shell. If the enterprise is so inclined, access to the HPC system 100 may be provided to a remote computer 240. The remote computer 240 may access the HPC system by way of a login to the management node 220 as just described, or using a gateway or proxy system as is known to persons in the art.

The hardware computing resources of the HPC system 100 (e.g., the processors, memory, non-volatile storage, and I/O devices shown in FIG. 1) are provided collectively by one or more "blade chassis," such as blade chassis 252, 254, 256, 258 shown in FIG. 2, that are managed and allocated into computing partitions. A blade chassis is an electronic chassis that is configured to house, power, and provide high-speed data communications between a plurality of stackable, modular electronic circuit boards called "blades." Each blade includes enough computing hardware to act as a standalone computing server. The modular design of a blade chassis permits the blades to be connected to power and data lines with a minimum of cabling and vertical space.

Accordingly, each blade chassis, for example blade chassis 252, has a chassis management controller 260 (also referred to as a "chassis controller" or "CMC") for managing system functions in the blade chassis 252, and a number of blades 262, 264, 266 for providing computing resources. Each blade, for example blade 262, contributes its hardware computing resources to the collective total resources of the HPC system 100. The system management node 220 manages the hardware computing resources of the entire HPC system 100 using the chassis controllers, such as chassis controller 260, while each chassis controller in turn manages the resources for just the blades in its blade chassis. The chassis controller 260 is physically and electrically coupled to the blades 262-266 inside the blade chassis 252 by means of a local management bus 268, described below in more detail. The hardware in the other blade chassis 254-258 is similarly configured.

The chassis controllers communicate with each other using a management connection 270. The management connection 270 may be a high-speed LAN, for example, running an Ethernet communication protocol, or other data bus. By contrast, the blades communicate with each other using a computing connection 280. To that end, the computing connection 280 illustratively has a high-bandwidth, low-latency system interconnect, such as NumaLink, developed by Silicon Graphics International Corp. of Fremont, Calif.

The chassis controller 260 provides system hardware management functions to the rest of the HPC system. For example, the chassis controller 260 may receive a system boot command from the SMN 220, and respond by issuing boot commands to each of the blades 262-266 using the local management bus 268. Similarly, the chassis controller 260 may receive hardware error data from one or more of the blades 262-266 and store this information for later analysis in combination with error data stored by the other chassis controllers. In some embodiments, such as that shown in FIG. 2, the SMN 220 or an enterprise computer 230 are provided access to a single, master chassis controller 260 that processes system management commands to control the HPC system 100 and forwards these commands to the other chassis controllers. In other embodiments, however, an SMN 220 is coupled directly to the management connection 270 and issues commands to each chassis controller individually. Persons having ordinary skill in the art may contemplate variations of these designs that permit the same type of functionality, but for clarity only these designs are presented.

The blade chassis 252, its blades 262-266, and the local management bus 268 may be provided as known in the art. However, the chassis controller 260 may be implemented using hardware, firmware, or software provided by the HPC system designer. Each blade provides the HPC system 100 with some quantity of processors, volatile memory, non-volatile storage, and I/O devices that are known in the art of standalone computer servers. However, each blade also has hardware, firmware, and/or software to allow these computing resources to be grouped together and treated collectively as computing partitions, as described below in more detail in the section entitled "System Operation."

While FIG. 2 shows an HPC system 100 having four chassis and three blades in each chassis, it should be appreciated that these figures do not limit the scope of the invention. An HPC system may have dozens of chassis and hundreds of blades; indeed, HPC systems often are desired because they provide very large quantities of tightly-coupled computing resources.

Figure 3:
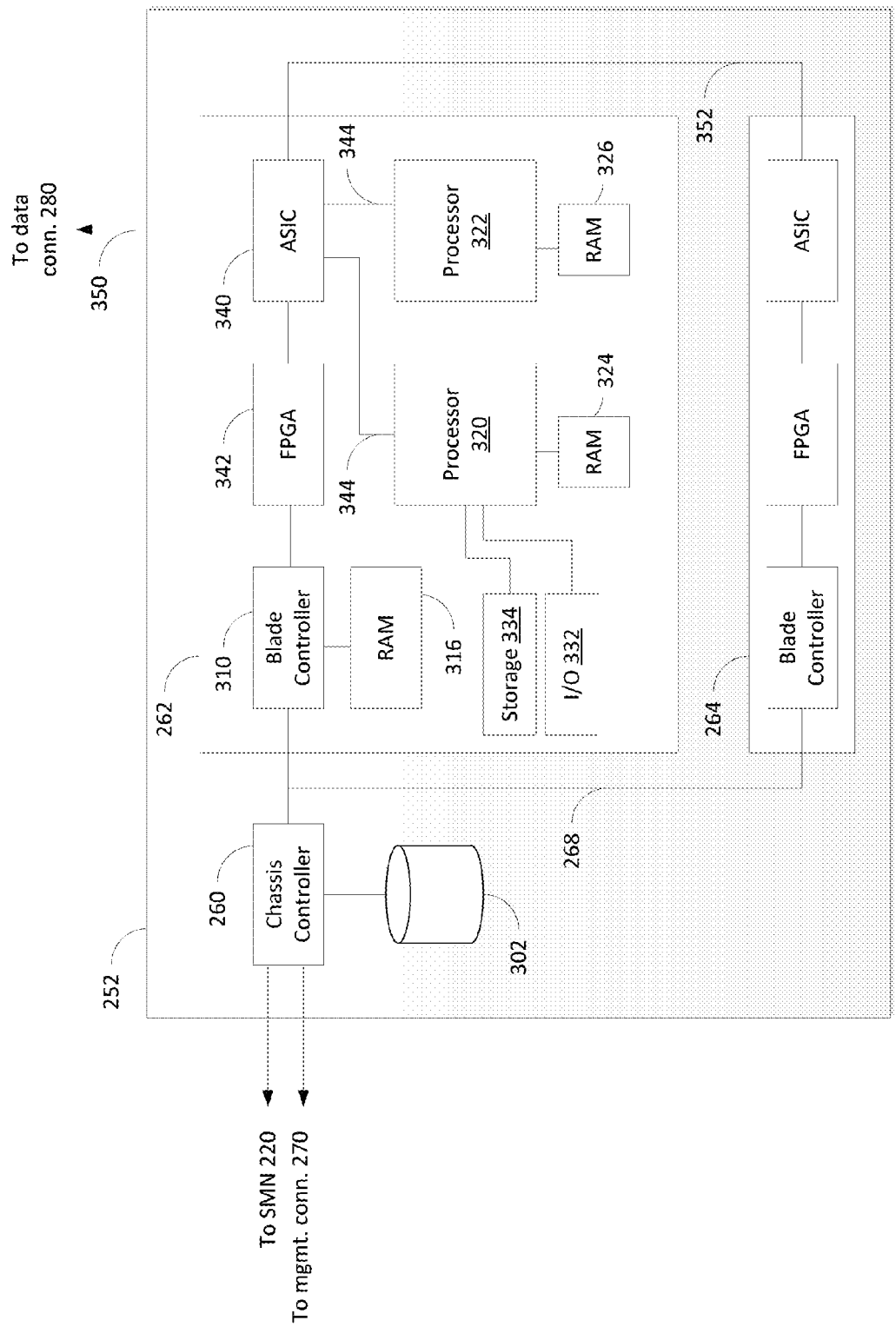
FIG. 3 schematically shows details of a blade chassis of the HPC system of FIG. 1.

FIG. 3 schematically shows a single blade chassis 252 in more detail. In this figure, parts not relevant to the immediate description have been omitted. The chassis controller 260 is shown with its connections to the system management node 220 and to the management connection 270. The chassis controller 260 may be provided with a chassis data store 302 for storing chassis management data. In some embodiments, the chassis data store 302 is volatile random access memory ("RAM"), in which case data in the chassis data store 302 are accessible by the SMN 220 so long as power is applied to the blade chassis 252, even if one or more of the computing partitions has failed (e.g., due to an OS crash) or a blade has malfunctioned. In other embodiments, the chassis data store 302 is non-volatile storage such as a hard disk drive ("HDD") or a solid state drive ("SSD"). In these embodiments, data in the chassis data store 302 are accessible after the HPC system has been powered down and rebooted.

FIG. 3 shows relevant portions of specific implementations of the blades 262 and 264 for discussion purposes. The blade 262 includes a blade management controller 310 (also called a "blade controller" or "BMC") that executes system management functions at a blade level, in a manner analogous to the functions performed by the chassis controller at the chassis level. For more detail on the operations of the chassis controller and blade controller, see the section entitled "System Operation" below. The blade controller 310 may be implemented as custom hardware, designed by the HPC system designer to permit communication with the chassis controller 260. In addition, the blade controller 310 may have its own RAM 316 to carry out its management functions. The chassis controller 260 communicates with the blade controller of each blade using the local management bus 268, as shown in FIG. 3 and the previous figures.

The blade 262 also includes one or more processors 320, 322 that are connected to RAM 324, 326. Blade 262 may be alternately configured so that multiple processors may access a common set of RAM on a single bus, as is known in the art. It should also be appreciated that processors 320, 322 may include any number of central processing units ("CPUs") or cores, as is known in the art. The processors 320, 322 in the blade 262 are connected to other items, such as a data bus that communicates with I/O devices 332, a data bus that communicates with non-volatile storage 334, and other buses commonly found in standalone computing systems. (For clarity, FIG. 3 shows only the connections from processor 320 to these other devices.) The processors 320, 322 may be, for example, Intel® Core™ processors manufactured by Intel Corporation. The I/O bus may be, for example, a PCI or PCI Express ("PCIe") bus. The storage bus may be, for example, a SATA, SCSI, or Fibre Channel bus. It will be appreciated that other bus standards, processor types, and processor manufacturers may be used in accordance with illustrative embodiments of the present invention.

Each blade (e.g., the blades 262 and 264) includes an application-specific integrated circuit 340 (also referred to as an "ASIC", "hub chip", or "hub ASIC") that controls much of its functionality. More specifically, to logically connect the processors 320, 322, RAM 324, 326, and other devices 332, 334 together to form a managed, multi-processor, coherently-shared distributed-memory HPC system, the processors 320, 322 are electrically connected to the hub ASIC 340. The hub ASIC 340 thus provides an interface between the HPC system management functions generated by the SMN 220, chassis controller 260, and blade controller 310, and the computing resources of the blade 262.

In this connection, the hub ASIC 340 connects with the blade controller 310 by way of a field-programmable gate array ("FPGA") 342 or similar programmable device for passing signals between integrated circuits. In particular, signals are generated on output pins of the blade controller 310, in response to commands issued by the chassis controller 260. These signals are translated by the FPGA 342 into commands for certain input pins of the hub ASIC 340, and vice versa. For example, a "power on" signal received by the blade controller 310 from the chassis controller 260 requires, among other things, providing a "power on" voltage to a certain pin on the hub ASIC 340; the FPGA 342 facilitates this task.

The field-programmable nature of the FPGA 342 permits the interface between the blade controller 310 and ASIC 340 to be reprogrammable after manufacturing. Thus, for example, the blade controller 310 and ASIC 340 may be designed to have certain generic functions, and the FPGA 342 may be used advantageously to program the use of those functions in an application-specific way. The communications interface between the blade controller 310 and ASIC 340 also may be updated if a hardware design error is discovered in either module, permitting a quick system repair without requiring new hardware to be fabricated.

Also in connection with its role as the interface between computing resources and system management, the hub ASIC 340 is connected to the processors 320, 322 by way of a high-speed processor interconnect 344. In one embodiment, the processors 320, 322 are manufactured by Intel Corporation which provides the Intel® QuickPath Interconnect ("QPI") for this purpose, and the hub ASIC 340 includes a module for communicating with the processors 320, 322 using QPI. Other embodiments may use other processor interconnect configurations.

The hub chip 340 in each blade also provides connections to other blades for high-bandwidth, low-latency data communications. Thus, the hub chip 340 includes a link 350 to the computing connection 280 that connects different blade chassis. This link 350 may be implemented using networking cables, for example. The hub ASIC 340 also includes connections to other blades in the same blade chassis 252. The hub ASIC 340 of blade 262 connects to the hub ASIC 340 of blade 264 by way of a chassis computing connection 352. The chassis computing connection 352 may be implemented as a data bus on a backplane of the blade chassis 252 rather than using networking cables, advantageously allowing the very high speed data communication between blades that is required for high-performance computing tasks. Data communication on both the inter-chassis computing connection 280 and the intra-chassis computing connection 352 may be implemented using the NumaLink protocol or a similar protocol.

System Operation

System management commands generally propagate from the SMN 220, through the management connection 270 to the blade chassis (and their chassis controllers), then to the blades (and their blade controllers), and finally to the hub ASICS that implement the commands using the system computing hardware.

As a concrete example, consider the process of powering on an HPC system. In accordance with exemplary embodiments of the present invention, the HPC system 100 is powered when a system operator issues a "power on" command from the SMN 220. The SMN 220 propagates this command to each of the blade chassis 252-258 by way of their respective chassis controllers, such as chassis controller 260 in blade chassis 252. Each chassis controller, in turn, issues a "power on" command to each of the respective blades in its blade chassis by way of their respective blade controllers, such as blade controller 310 of blade 262. Blade controller 310 issues a "power on" command to its corresponding hub chip 340 using the FPGA 342, which provides a signal on one of the pins of the hub chip 340 that allows it to initialize. Other commands propagate similarly.

Once the HPC system is powered on, its computing resources may be divided into computing partitions. The quantity of computing resources that are allocated to each computing partition is an administrative decision. For example, an enterprise may have a number of projects to complete, and each project is projected to require a certain amount of computing resources. Different projects may require different proportions of processing power, memory, and I/O device usage, and different blades may have different quantities of the resources installed. The HPC system administrator takes these considerations into account when partitioning the computing resources of the HPC system 100. Partitioning the computing resources may be accomplished by programming each blade's RAM 316. For example, the SMN 220 may issue appropriate blade programming commands after reading a system configuration file.

The collective hardware computing resources of the HPC system 100 may be divided into computing partitions according to any administrative need. Thus, for example, a single computing partition may include the computing resources of some or all of the blades of one blade chassis 252, all of the blades of multiple blade chassis 252 and 254, some of the blades of one blade chassis 252 and all of the blades of blade chassis 254, all of the computing resources of the entire HPC system 100, and other similar combinations. Hardware computing resources may be partitioned statically, in which case a reboot of the entire HPC system 100 is required to reallocate hardware. Alternatively and preferentially, hardware computing resources are partitioned dynamically while the HPC system 100 is powered on. In this way, unallocated resources may be assigned to a partition without interrupting the operation of other partitions.

It should be noted that once the HPC system 100 has been appropriately partitioned, each partition may be considered to act as a standalone computing system. Thus, two or more partitions may be combined to form a logical computing group inside the HPC system 100. Such grouping may be necessary if, for example, a particular computational task is allocated more processors or memory than a single operating system can control. For example, if a single operating system can control only 64 processors, but a particular computational task requires the combined power of 256 processors, then four partitions may be allocated to the task in such a group. This grouping may be accomplished using techniques known in the art, such as installing the same software on each computing partition and providing the partitions with a VPN.

Once at least one partition has been created, the partition may be booted and its computing resources initialized. Each computing partition, such as partition 160, may be viewed logically as having a single OS 191 and a single BIOS 192. As is known in the art, a BIOS is a collection of instructions that electrically probes and initializes the available hardware to a known state so that the OS can boot, and is typically provided in a firmware chip on each physical server. However, a single logical computing partition 160 may span several blades, or even several blade chassis. A blade may be referred to as a "computing node" or simply a "node" to emphasize its allocation to a particular partition, however it will be understood that a physical blade may comprise more than one computing node if it has multiple processors 320, 322 and memory 324, 326.

Booting a partition in accordance with an embodiment of the invention requires a number of modifications to be made to a blade chassis that is purchased from stock. In particular, the BIOS in each blade is modified to determine other hardware resources in the same computing partition, not just those in the same blade or blade chassis. After a boot command has been issued by the SMN 220, the hub ASIC 340 eventually provides an appropriate signal to the processor 320 to begin the boot process using BIOS instructions. The BIOS instructions, in turn, obtain partition information from the hub ASIC 340 such as: an identification (node) number in the partition, a node interconnection topology, a list of devices that are present in other nodes in the partition, a master clock signal used by all nodes in the partition, and so on. Armed with this information, the processor 320 may take whatever steps are required to initialize the blade 262, including 1) non-HPC-specific steps such as initializing I/O devices 332 and non-volatile storage 334, and 2) also HPC-specific steps such as synchronizing a local hardware clock to a master clock signal, initializing HPC-specialized hardware in a given node, managing a memory directory that includes information about which other nodes in the partition have accessed its RAM, and preparing a partition-wide physical memory map.

At this point, each physical BIOS has its own view of the partition, and all of the computing resources in each node are prepared for the OS to load. The BIOS then reads the OS image and executes it, in accordance with techniques known in the art of multiprocessor systems. The BIOS presents to the OS a view of the partition hardware as if it were all present in a single, very large computing device, even if the hardware itself is scattered among multiple blade chassis and blades. In this way, a single OS instance spreads itself across some, or preferably all, of the blade chassis and blades that are assigned to its partition. Different operating systems may be installed on the various partitions. If an OS image is not present, for example immediately after a partition is created, the OS image may be installed using processes known in the art before the partition boots.

Once the OS is safely executing, its partition may be operated as a single logical computing device. Software for carrying out desired computations may be installed to the various partitions by the HPC system operator. Users may then log into the SMN 220. Access to their respective partitions from the SMN 220 may be controlled using volume mounting and directory permissions based on login credentials, for example. The system operator may monitor the health of each partition, and take remedial steps when a hardware or software error is detected. The current state of long-running application programs may be saved to non-volatile storage, either periodically or on the command of the system operator or application user, to guard against losing work in the event of a system or application crash. The system operator or a system user may issue a command to shut down application software. Other operations of an HPC partition may be known to a person having ordinary skill in the art. When administratively required, the system operator may shut down a computing partition entirely, reallocate or deallocate computing resources in a partition, or power down the entire HPC system 100.

Blade Extension Space

In accordance with illustrative embodiments, computing blades 262 are modified to include an extension space that has bulk storage devices that provide non-volatile memory. In this way, bulk data that are gathered from "real world" measurement instruments may be placed in direct contact with computing nodes for extremely low latency and high bandwidth access using previously unused bus capacity.

Figure 4:
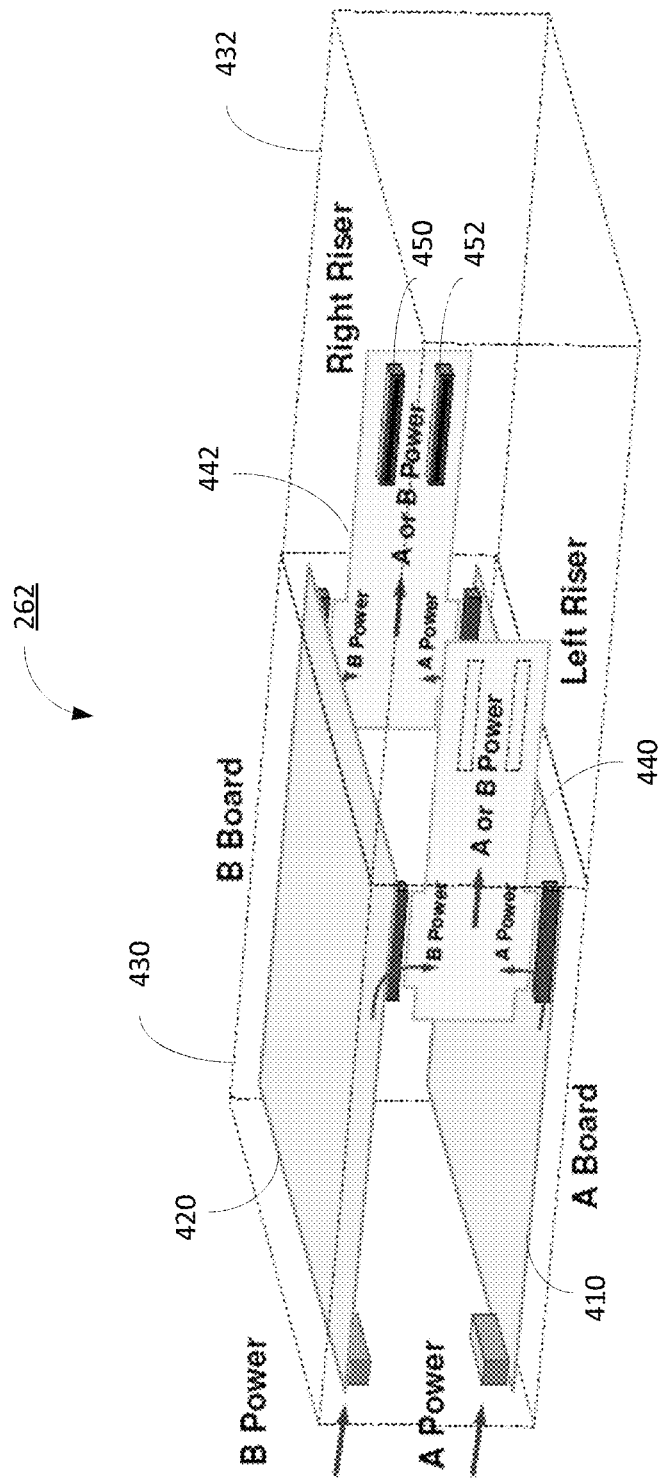
FIG. 4 shows a blade having two computing circuit boards that cooperate to provide power to an extension space in accordance with an embodiment of the invention.

FIG. 4 shows a blade 262 having two computing circuit boards 410, 420 that cooperate to provide power to an extension space 432 in accordance with an embodiment of the invention. These two computing circuit boards, the A board 410 and the B board 420, include hardware that is independently operable. In this way, the loss of one board does not render the entire blade 262 inoperable. For example, the A board 410 receives power independently from the B board 420, and the A board 410 may house a computing processor 320 and RAM 324, while the B board 420 houses a different computing processor 322 and RAM 326, or each board may house multiple processors. Each board may be configured as a separate computing node, so that the blade 262 includes two computing nodes. Or, if the computing processors 320, 322 include a plurality of cores, each core may be configured as a separate computing node, as described above. The various hardware components in the blade 262 are distributed between the circuit boards so that the nodes may operate independently within the HPC system 100. Although only two circuit boards are shown in the blade 262 for clarity of discussion, it will be appreciated that any number of boards may be installed in a single blade 262.

In the embodiment of FIG. 4, the blade 262 acts as a housing for the A board 410 and the B board 420, which are mounted in opposition in a first region 430 of the blade 262. The two boards 410, 420 define the boundaries of the first region 430. Adjacent to the first region is a second region 432 for providing extension space. In an illustrative embodiment of the invention, this extension space houses bulk data storage, in the form of a non-volatile memory device or devices. The blade 262 includes two riser circuits, a left riser 440 and a right riser 442. Each riser circuit provides two power and data connections 450, 452 between the first and second regions 430, 432 in a fault-tolerant manner. Thus, these connections 450, 452 convey power from the computing circuit boards 410, 420 to the bulk data storage in the second region 432, and convey data between the computing circuit boards 410, 420 and the bulk data storage. For the sake of clarity, however, FIG. 4 refers only to the power connections.

The power and data connections 450, 452 provide power lines and buses from the A board 410 and B board 420 to the second region 432 (and in illustrative embodiments, to the non-volatile memory). The connectors 450, 452 are configured to provide power and data to the second region 432 even after failure of one of the computing circuit boards 410, 420. This is accomplished by providing two risers that include different circuit routes, as described in more detail in connection with FIGS. 5 and 6. The power connectors and the data connectors need not be provided in a single, physical connector as shown, but may be provided using separate connectors.

It should be appreciated that the configuration of the computing circuit boards 410, 420 and the riser boards 440, 442 is physically arranged so that cooling may be provided throughout the housing provided by the blade 262. Thus, any fans, heat sinks, or other cooling devices or systems that are disposed in the first region 430 may be configured so as to also provide cooling to the second region 432, either by convective or conductive cooling. Such cooling, if ordinarily provided as part of the A board 410 or the B board 420, also may be redundantly provided to the second region 432, so that loss of either board 410, 420 does not eliminate cooling in the second region 432.

FIG. 5A shows an unfolded plan view of the hardware of the two circuit boards of FIG. 4, where the extension space is configured according to one embodiment of the invention. The A board 410 and B board 420 are visible on the left. These boards define the first region 430. To the right, the second region 432 includes the left riser 440 (visible at both top and bottom) and the right riser 442 (visible twice in the center of the figure on either side of the fold). Each power or data connection (e.g. connection 450) on each riser is fitted with a PCI Express expansion card. There are a total of four such cards 460a-460d. These expansion cards 460a-460d provide power and data connections to a number of non-volatile storage devices, which may be solid state devices ("SSD") such as flash memory device 470. The data connections may use lanes of a PCI Express bus that are otherwise unused by the HPC system 100, thereby providing data flow into and out of the system without causing any latency in ongoing calculations.

The second region 432 of the housing may include a sliding drawer that telescopes out to facilitate service access to the non-volatile memory 470, as shown. This drawer may be constructed using manufacturing methods known in the art, although it should be designed to accommodate easy access to a potentially large number of storage devices 470 therein, and to the expansion cards 460a-460d. This design is especially important, for example, if there are a large number of such storage devices 470, or if they must be regularly exchanged to ingest incoming measurement data into the HPC system 100.

Figure 5B:
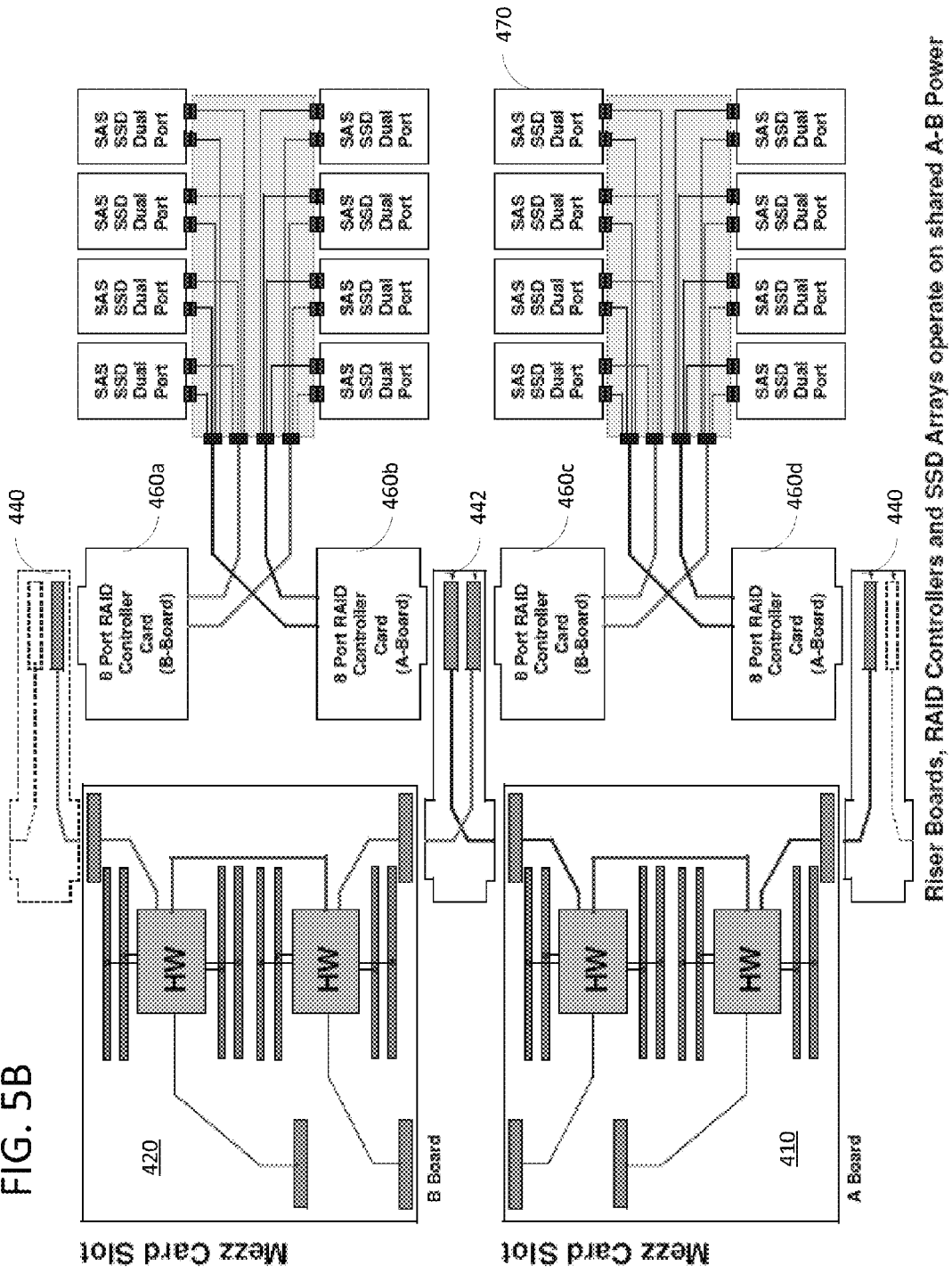
FIG. 5B shows the power and data connections of FIG. 5A.

FIG. 5B shows the power and data connections of FIG. 5A. As noted above, the power and data connectors are configured to provide power and data to the second region 432 even after one of the computing circuit boards 410, 420 fails, by configuring different circuit routes in the two riser circuit boards 440, 442. Thus, the left riser 440 may route power and data from the A board 410 to its bottom connector (as shown at the bottom of the figure) and from the B board 420 to its top connector (as shown at the top of the figure), while the right riser 442 routes power and data from the B board 420 to its bottom connector and from the A board 410 to its top connector (as shown in the center of the figure).

In FIG. 5B, the four expansion cards 460a-460d are redundant array of independent disks ("RAID") controllers that are coupled to the SSD storage devices 470, for example using a serial attached SCSI ("SAS") connection, and access the devices using a "RAID level" as is known in the art. In an alternate embodiment, a serial ATA ("SATA") connection may be used. The expansion cards 460a-460d provide host bus adapters that couple the PCI Express bus from the riser cards 440, 442 to the bus connected to the storage devices 470. Each storage device 470 has a dual port capability, which means that if a failure occurs along a path to one of the ports (e.g., due to loss of a single board), the device may still be operated using the other port.

Extremely high availability is provided as follows. Each storage device 470 is connected to two RAID controllers 460 using its dual port functionality. Thus, if either RAID controller fails, the other RAID controller can still operate all of the storage devices. The two RAID controllers connected to each storage device 470 receive power and data connections from two different riser circuits 440, 442. Due to the different circuit paths routing power and data to the connectors 450, 452 on the different riser circuits 440, 442, if either riser circuit fails, the other riser circuit includes two RAID controllers that can control all of the storage devices 470 in the extension space 432. Finally, if either the A board 410 or the B board 420 fails (for example, due to a loss of power), the two riser circuits 440, 442 each provide power and data connections to the other board's RAID controllers. Each storage device 470 is connected to one of these two remaining operable RAID controllers, again due to the different circuit paths on riser circuits 440, 442 routing power and data to their respective connectors 450, 452. Thus, the remainder of the HPC system 100 can still access all of the data stored in the extension space 432 after a wide variety of failures, or combinations of failures.

FIG. 6A shows an unfolded plan view of the hardware of the two circuit boards of FIG. 4, where the second region 432 is configured according to another embodiment of the invention. Power and data connections are redundant in these figures, just as in FIGS. 5A and 5B, and provide the aforementioned advantages. Unlike FIGS. 5A and 5B, however, the adapter card 480 and storage devices 490a-490d use PCI Express directly, so there is no need for a host bus adapter. Thus, data access is even lower latency in this embodiment. In FIG. 6A, the top half connections of the riser circuits 440, 442 are omitted for clarity only.

In the embodiment of FIG. 6A, the second region 432 is configured with two adapter cards 480 (only one is shown for clarity). Each adapter card 480 provides power and data connections between the two computing circuit boards 410, 420 and a number of PCI Express SSD flash modules 490a-490d. Each flash module 490a-490d may store, for example, 4 or 8 terabytes of non-volatile memory. However, because there are no moving parts in the SSD memory, access times are lower, and channel capacities are higher, than SAS or SATA hard disk drives. Performance is further increased by the lack of a need for a host bus adapter.

Figure 6B:
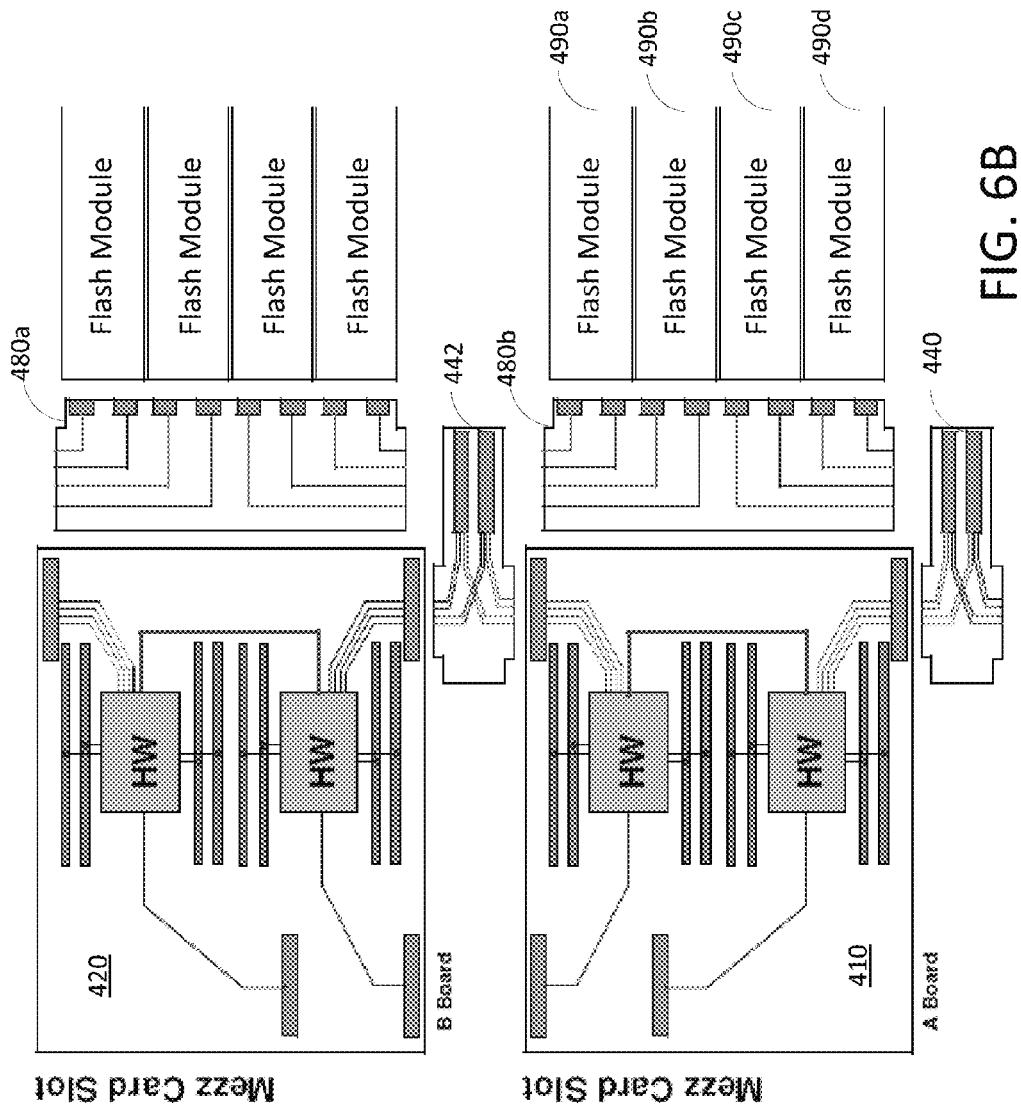
FIG. 6B shows the power and data connections of FIG. 6A.

FIG. 6B shows the power and data connections of FIG. 6A. Each adapter card 480a, 480b connects power and the PCI Express bus to four dual-control flash modules 490a-490d. Each storage device 490a-490d is connected to two data paths on one of the risers 440, 442 using its dual port functionality. Each of these two data paths is routed from a different computing circuit board 410 or 420, so that each power and data connection 450, 452 includes data paths from both boards 410, 420. Thus, if either the A board 410 or the B board 420 fails, the other board can still operate all of the storage devices using all four of the connections 450, 452. Other recoverable failure modes are discussed above in connection with FIGS. 5A, 5B.

FIG. 7A shows an unfolded plan view of the hardware of the two circuit boards of FIG. 4, where the extension space is configured according to a third embodiment of the invention. In the embodiment of FIG. 7A, two additional riser cards 444 and 446 are used to double the number of PCI Express cards that are available to shuttle data between the boards 410, 420 and the extension space 432. In this way, additional lanes of the PCI Express bus are used, doubling throughput while keeping latency the same. FIG. 7B shows the power and data connections of FIG. 7A. As can be seen from this figure, the extension space is provided with four riser circuits 440, 442, 444, 446 rather than just two such circuits, improving resiliency and bandwidth of data transfer. Other recoverable failure modes are discussed above in connection with FIGS. 5A, 5B.

The close proximity of computing power and bulk data storage has several advantages over the prior art. For instance, a Linux cluster ("Lustre") file system includes a metadata server and one or more object storage servers that provide data to a client device. Typically, these three functions are distributed across a data network such as InfiniBand and TCP/IP over Ethernet. However, in accordance with various embodiments of the present invention, no such data networks are required because the bulk storage is connected directly to a data bus of the computing blade 262. Thus, one or two blades 262 can provide the functionality of the Lustre system, with higher throughput and lower latency access to the data, and without requiring additional expense to set up a separate storage domain.

Also, HPC computations generally require a great deal of time, so it is known in the art to store the computational state of the HPC system 100 to non-volatile system memory, for example to perform back-ups or checkpoints from which to restart in case of an emergency. Due to the large quantities of data required to encode the state, the back-up process has been known to take a great deal of time, so it is repetitively performed only on a timescale of hours (e.g., a new checkpoint is created every four hours). In accordance with embodiments of the invention, however, access times between the computing circuit boards 410, 420 and the non-volatile storage 470, 490 may be so low and bandwidth so high that such checkpoints can be created advantageously on a timescale of seconds, or even less than a second. Creating checkpoints in a matter of seconds is highly advantageous, for a number of reasons. It may permit multi-tasking of large-scale computations, for example, because one computation may be "swapped out" to the non-volatile memory, and a new computing "swapped in", very quickly. Or, it may permit calculations to be reset to an earlier time period in accordance with the requirements of certain computational algorithms.

As an additional advantage, the localized fast bulk data storage may be used as a burst buffering system. Some applications generate large amounts of I/O traffic in bursts. To handle these bursts, some HPC systems provide a large maximum channel throughput (often, at great expense). However, when no data burst is present, these large channels operate at well below their maximum capacity, and represent largely dormant hardware resources. For example, some prior art systems operate at less than one-third of maximum bandwidth capacity for 99% of the time. In accordance with various embodiments of the invention, however, the localized bulk data storage may be used as a burst buffer; that is, bursty data received by a computing blade 262 may be quickly stored in the non-volatile memory 470 or 490 until it can be processed. This buffering process may occur without interruption or degradation of the I/O latency or bandwidth in the rest of the system, because it uses otherwise unused lanes of the blade's local PCI Express bus. An HPC system 100 using this improvement may be designed to have a high capacity, low latency local burst buffer and a lower interconnect capacity (at reduced cost), or it may have a higher interconnect capacity and be configured to handle larger bursts of data.

Figure 8:
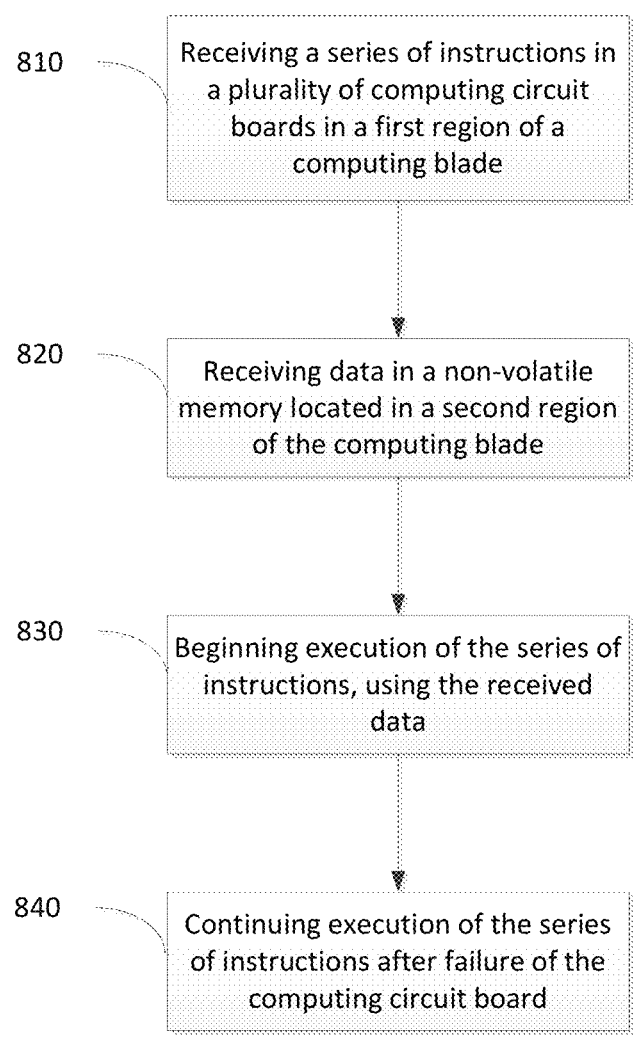
FIG. 8 is a flowchart showing a method of performing a computation in an HPC system, according to an embodiment of the invention.

FIG. 8 is a flowchart showing a method of performing a computation in the HPC system 100. The method begins in process 810 with receiving a series of instructions (for example, program code) in a plurality of computing circuit boards, for example the A board 410 and the B board 420, located in a first region 430 of a computing blade 262. These instructions may be received in conventional fashion, for example from the system management node 220 using the management connection 270.

Next, process 820 requires receiving data in a non-volatile memory such as memory 470, located in a section region 432 of the computing blade 262. These data can be received either from the system management node 220, or through a data ingestion network as described in more detail below in connection with FIGS. 9-11. The non-volatile memory 470 is coupled to the plurality of computing circuit boards 410, 420 using a plurality of power connectors and a plurality of data connectors (for example, the connectors 450, 452 on the riser card 442).

Process 830 involves performing the computation by execution of the series of instructions using the received data. This may be done using techniques known in the art of HPC systems. However, process 840 requires continuing to execute, without interruption, the series of instructions after failure of a computing circuit board (for example, the A board 410), a power connector, or a data connector (for example, the connectors 450, 452). This non-interruption of execution is enabled because, in accordance with various embodiments of the invention, the first region of the blade is connected to the second region of the blade using redundant power, data, and cooling. Therefore, as described above in connection with FIG. 5B, failure of any one of these components, or even multiple components, does not produce a system failure that ends the computation, provided at least one path is available for power and data to move between the first region 430 of the blade 262 and the second region 432 of the blade. After process 840, the failed component may be recognized by a surviving computing circuit board, which may then transmit an error message to the system management node 220 according to methods known in the art. Subsequent to this error message, the telescoping drawer may be opened to service the failed components.

Moving Data to and from the Extension Space

Figure 9:
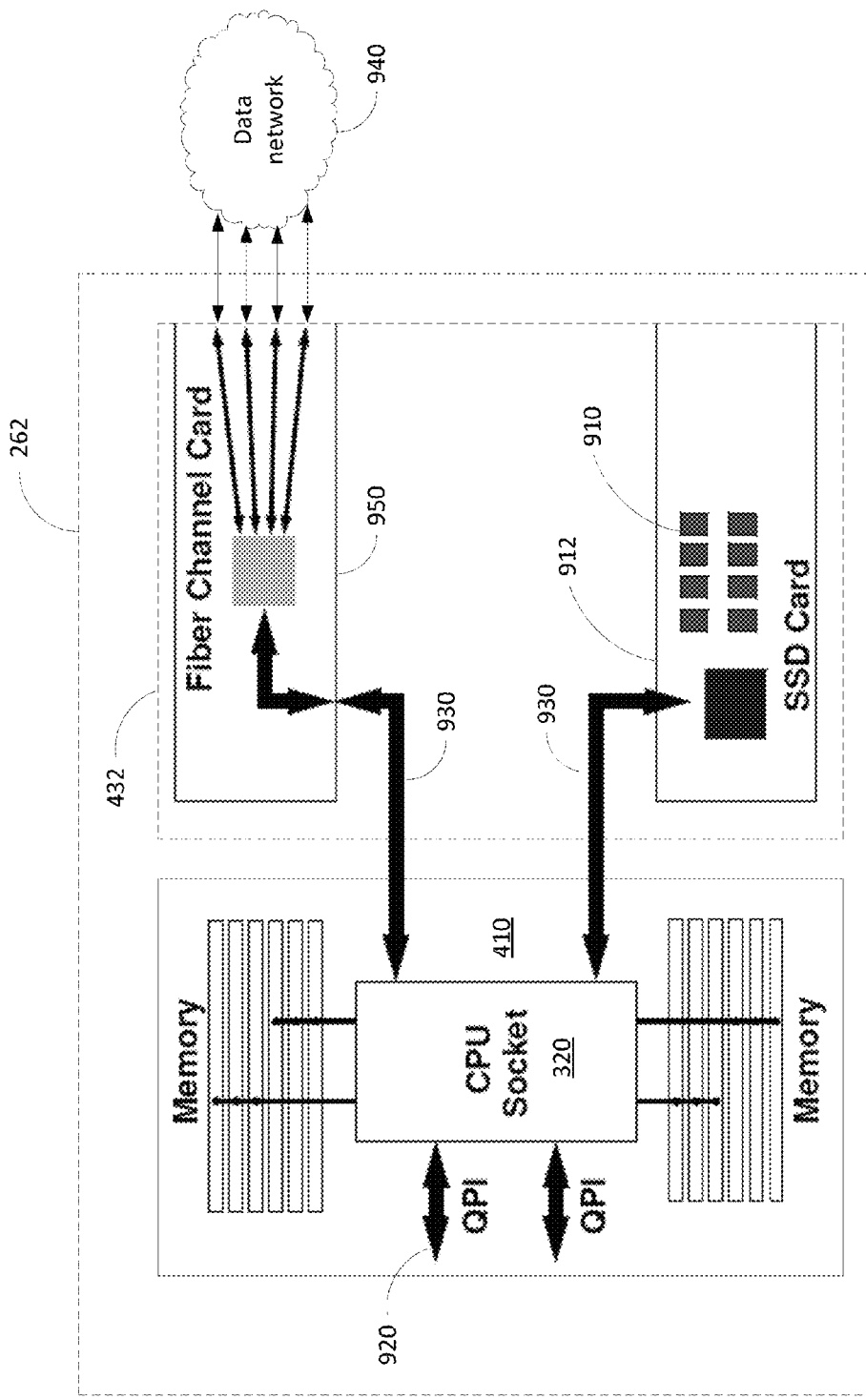
FIG. 9 schematically shows a system for moving bulk data into the extension space of an embodiment.

FIG. 9 schematically shows a system for moving bulk data into the extension space 432 described above. A processor 320 is shown on a computing circuit board, in this case A board 410. Data is stored in a non-volatile storage device, such as SSD memory 910, controlled by a storage controller 912.

Data may be arrive in the blade from a number of locations. As a first possibility, data may arrive from another processor in the HPC system 100. For example, the data may arrive from a blade 264 using a chassis computing connection 352. This data would arrive at the processor 320 by way of the blade's hub ASIC (not shown) via a processor interconnect 920. The data may be stored temporarily in the memory of the board 410, or moved immediately to the non-volatile memory 910 by way of data connection 930, which represents the redundant data connection between the first region and the second region of the blade 262, as described above in connection with FIGS. 5-7.

As a second possibility, data may arrive from a data network 940. This may be the case, for example, if the HPC system 100 is connected to a large data storage facility, such as a network attached storage ("NAS") or a storage area network ("SAN"). In this scenario, the extension space 432 includes a data communication device 950. As shown in FIG. 9, this device may be a Fiber Channel card; in other embodiments, this may be a SAS device, an Ethernet card, or other similar device. The data communication device 950 receives the bulk data from the data network 940, then transmits it via the data connection 930 to the processor 320. The data connection 930 represents the redundant data connection between the first region and the second region of the blade 262, as described above. As with the first scenario, the data are then forwarded by the processor 320, using the data connection 930, to the storage controller 912 in the extension space 432 for storage on a non-volatile memory 910.

It will be noted that, in accordance with either of these two data movement methods, the processor 320 must stop executing whatever program code or instructions it is executing to move the data between the processor 320 and the non-volatile memory 910. Movement of data therefore prevents the processor 320 from devoting all of its time to a user-desired computation. Some such computations are data-intensive, and therefore might require populating the non-volatile storage capacity of the extension space several times over. In such situations, it is very disadvantageous to stop the processor 320 a number of times for long durations to perform data movement operations, because the computation takes longer to complete than required.

Figure 10:
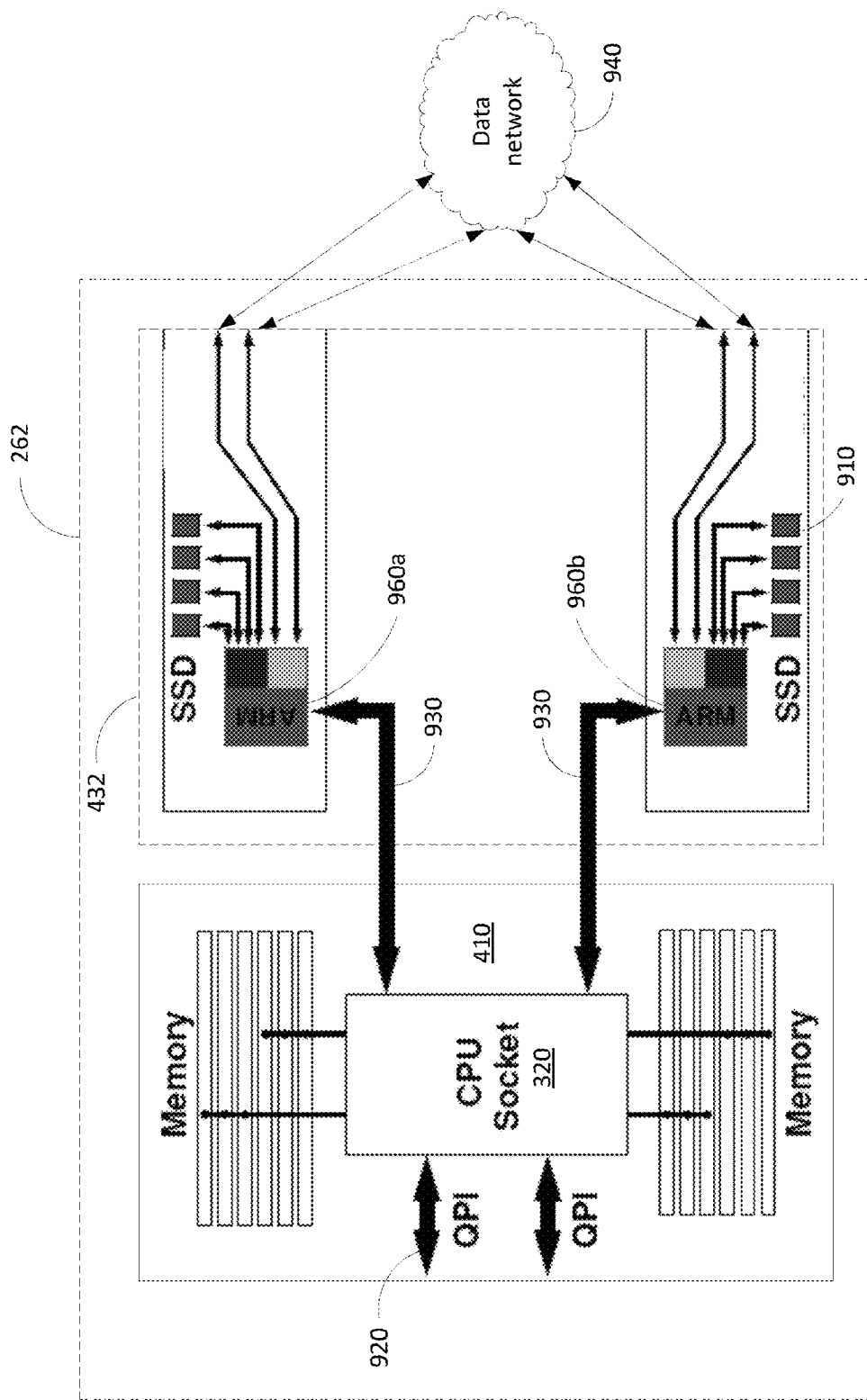
FIG. 10 schematically shows a system for moving bulk data into the extension space of another embodiment.

Therefore, in accordance with an embodiment of the invention, a system and method are disclosed for moving data into the extension space 432 without interrupting the operations of the processor 320. An illustrated embodiment of the system is shown in FIG. 10. The system operates by providing one or more additional processors 960a, 960b in the extension space 432, whose purpose is to convey data between the data network 940 and the non-volatile storage 910 without interrupting the computation being performed by the processor 320.

By way of illustration, the processor 960b is coupled to the external data network 940 using a protocol such as Fiber Channel, SAS, Ethernet as described above in connection with FIG. 9. The processor 960b is coupled directly to the non-volatile storage 910 (and the other non-volatile storage units). The processor 960b also is coupled to the computing processor 320 in the first region of the blade 262, to facilitate data copying between the computing first region 430 and the data storing second region 432. The processor 960b is shown as an ARM processor, although other types of processors may be used, including other embedded system processors. The processor 960a is similarly configured, and it should be understood that any number of additional such processors may be present in the extension space 432. It should also be appreciated that the use of multiple processors 960a, 960b permits multiple, redundant data connections between the extension space 432 and the data network 940, with all of the attendant advantages.

The use of a separate processor 960a or 960b (or a plurality of processors) is advantageous, for a number of reasons. As mentioned above in connection with FIG. 9, the use of a separate processor permits data to be moved into the extension space 432 without interrupting an ongoing calculation. Also, the cost of an additional processor and circuit board in the extension space 432 is modest compared with the overall cost of an HPC system 100. Further, the processors 960a, 960b may be used to perform general purpose computation other than the main computation. For instance, because the processors 960a, 960b are in the extension space 432 and perform data movement, they may be configured to track which data have been transferred to the processors 320, 322 and which have not. Such tracking provides the foundation for intelligent data management both in the extension space 432 and between blades. This data management may be performed by the processors 960a, 960b in a manner that does not interrupt the processors 320, 322 in the computing region 430.

As another advantage, the rapid movement of data using a data network external to the blades permits computations to be performed in a parallel manner, rather than serially as is currently done. For example, in determining the shape of a wing for use in an airplane, one might need to develop a computational fluid dynamics (CFD) model of the airflow around the wing to determine lift and drag, and also need to perform a structural integrity analysis of the wing based on the stresses of the various design materials. In prior art systems, these computations were performed separately many times over a variety of wing shapes and designs to determine various performance curves that had to be manually optimized by a human skilled in these arts. However, in accordance with various embodiments of the present invention, these computations may be performed in parallel on a single HPC system, with optimizations from one computation feeding into the other computation in real time. In this way, only a single, self-optimizing job needs to be run on the HPC system 100, rather than hundreds of such jobs.

Also, in various embodiments, the scaling problems of processing data may be divorced from the scaling problems of moving and storing the data. The problem of moving data into and out of the extension space 432 and moving it between the extension space 432 and the computing space 430 generally scales with the size and type of the computation. If the size of a computation is increased, the amount of data it operates on may be proportionately increased. Moreover, different computations have different data usage patterns. However, in accordance with illustrated embodiments, the type and cost of the hardware that is used to implement the computation (i.e., the processors 320, 322) advantageously may be scaled separately from the type and cost of the hardware that is used to provide data for the computation (i.e., the processors 960a, 960b). This differential scaling permits better (but more expensive) processors 320, 322 to be used for larger computational loads, and better (but more expensive) processors 960a, 960b to be used for larger data movement and storage loads, where the choices of types, numbers, and costs of the processors may be made separately or as part of an overall cost-sharing plan based on business needs.

Figure 11:
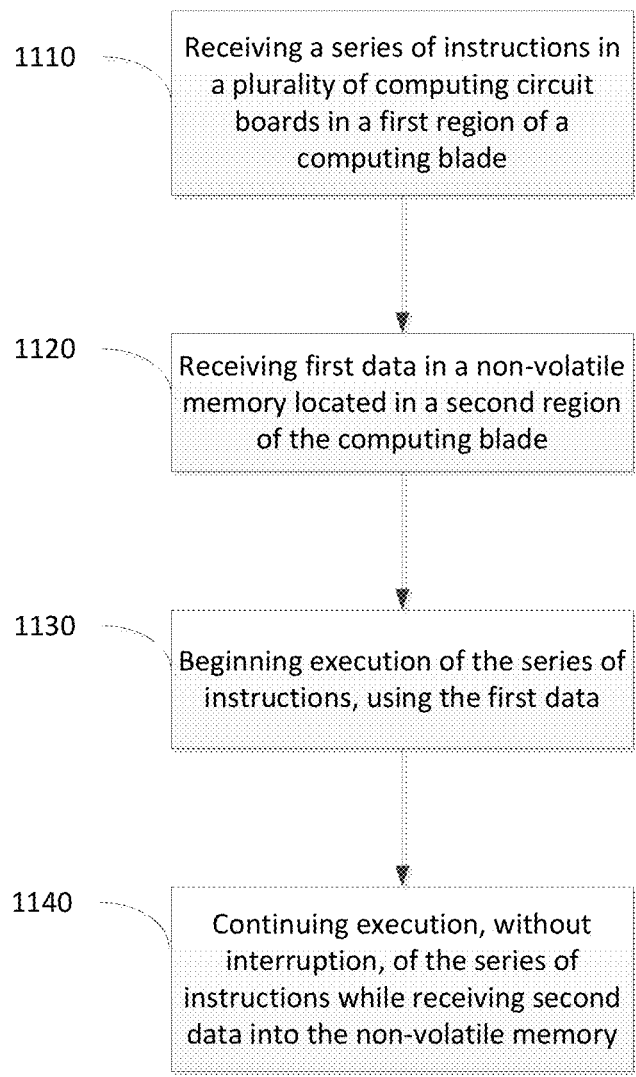
FIG. 11 is a flowchart showing a method of performing a computation in an HPC system, according to the system of FIG. 10.

FIG. 11 is a flowchart showing a method of performing a computation in an HPC system, according to the system of FIG. 10. The method begins in process 1110 with receiving a series of instructions in a plurality of computing circuit boards, for example the A board 410 and the B board 420, located in a first region 430 of a computing blade 262. These instructions may be received in conventional fashion, for example from the system management node 220 using the management connection 270.

Next, process 1120 requires receiving data in a non-volatile memory such as memory 470 or 910, located in a section region 432 of the computing blade 262. These data can be received either from the system management node 220, or through the data network 940. The non-volatile memory 470 is coupled to the plurality of computing circuit boards 410, 420 using a plurality of power connectors and a plurality of data connectors (for example, the connectors 450, 452 on the riser card 442).

Process 1130 involves performing the computation by execution of the series of instructions using the received data. This may be done using techniques known in the art of HPC systems. However, process 1140 requires continuing to execute, without interruption, the series of instructions using the first data while simultaneously receiving second data into the non-volatile memory 470 or 910. This non-interruption of execution is enabled because, in accordance with various embodiments of the invention, the separate processor(s) 960a, 960b manage the flow of the second data.

Although the above discussion discloses various exemplary embodiments of the invention, it should be apparent that those skilled in the art can make various modifications that will achieve some of the advantages of the invention without departing from the true scope of the invention.

It should be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

What is claimed is:

1. An HPC system having a plurality of housings, each housing including one or more computing blades that each have at least one computing processor, wherein a plurality of the computing processors in the HPC system are configured to cooperate to perform a computation defined by a user of the HPC system, and wherein at least one housing comprises:
    a computing region having a first computing processor that is used in performing the computation; and
    a data storing region, coupled to the computing region by a first data connector, the data storing region having a) a non-volatile memory containing data for use in performing the computation, b) a second data connector that is coupled to a data network external to the at least one housing, and c) a second computing processor, coupled to the first data connector, to the second data connector, and to the non-volatile memory;
    wherein the second computing processor is configured to (a) convey data, using the first data connector, between the non-volatile memory and the first computing processor for use in performing the computation, and to (b)

convey data, using the second data connector according to a data network protocol, between the data network external to the housing and the non-volatile memory without interrupting the performing of the computation by the first computing processor in the computing region.

2. The HPC system of claim 1, wherein the at least one housing further comprises a plurality of power connectors that redundantly convey power from the computing region to the data storing region.

3. The HPC system of claim 1, wherein the at least one housing further comprises a plurality of data connectors that redundantly convey data between the computing region and the data storing region.

4. The HPC system of claim 1, wherein the at least one housing includes a telescoping drawer that facilitates service access to the data storing region.

5. The HPC system of claim 1, wherein the non-volatile memory includes solid state memory.

6. The HPC system of claim 1, wherein the first data connector implements an expansion bus standard.

7. The HPC system of claim 6, wherein the expansion bus standard is PCI Express.

8. The HPC system of claim 1, wherein the second computing processor implements a RAID using the non-volatile memory.

9. The HPC system of claim 1, wherein the second computing processor is configured to receive the second data according to a data network protocol comprising: a Fiber Channel protocol, a Serial Attached SCSI (SAS) protocol, or an Ethernet protocol.

10. A method of performing a computation, in an HPC system having a plurality of housings, each housing including one or more computing blades that each have at least one computing processor, wherein a plurality of the computing processors in the HPC system are configured to cooperate to perform a computation defined by a user of the HPC system, the method comprising:

receiving, in a non-volatile memory located in a data storing region of a given housing, first data for performing a portion of the user-defined computation;

executing, by a first computing processor in a computing region of the given housing, a series of instructions to perform the portion of the user-defined computation, using the first data in the data storing region of the given housing;

receiving, by a second computing processor in the data storing region of the given housing, second data for performing the portion of the computation from a data network external to the given housing according to a data network protocol; and storing, by the second computing processor, the received second data into the non-volatile memory, wherein the processes of receiving and storing the second data into the data storing region do not interrupt the executing of the series of instructions by the first computing processor in the computing region.

11. The method of claim 10, wherein receiving the first data includes receiving the first data in a solid state memory.

12. The method of claim 10, wherein execution of the series of instructions using the first data includes a computing processor accessing the first data using a riser circuit board.

13. The method of claim 10, wherein execution of the series of instructions using the first data includes a computing processor accessing the non-volatile memory according to an expansion bus standard.

14. The method of claim 13, wherein the expansion bus standard is PCI Express.

15. The method of claim 10, further comprising implementing a RAID using the non-volatile memory.

16. The method of claim 10, further comprising receiving the second data according to a data network protocol comprising: a Fiber Channel protocol, a Serial Attached SCSI (SAS) protocol, or an Ethernet protocol.

17. A tangible, computer-readable medium having computer program code non-transitorily stored thereon, the computer program code for performing a computation, in an HPC system having a plurality of housings, each housing including one or more computing blades that each have at least one computing processor, wherein a plurality of the computing processors in the HPC system are configured to cooperate to perform a computation defined by a user of the HPC system, the program code comprising:

program code for receiving, in a non-volatile memory located in a data storing region of a given housing, first data for performing a portion of the user-defined computation;

program code for executing, by a first computing processor in a computing region of the given housing, a series of instructions to perform the portion of the user-defined computation, using the first data in the data storing region of the given housing;

program code for receiving, by a second computing processor in the data storing region of the given housing, second data for performing the portion of the computation from a data network external to the given housing according to a data network protocol; and program code for storing, by the second computing processor, the received second data into the non-volatile memory, wherein the processes of receiving and storing the second data into the data storing region do not interrupt the executing of the series of instructions by the first computing processor in the computing region.

18. The computer-readable medium of claim 17, wherein the program code for receiving the first data in a non-volatile memory includes program code for receiving the first data in solid state memory.

19. The computer-readable medium of claim 17, wherein the program code for execution of the series of instructions using the first data includes program code for a computing processor accessing the first data using a riser circuit board.

20. The computer-readable medium of claim 17, wherein the program code for execution of the series of instructions using the first data includes program code for a computing processor accessing the non-volatile memory according to an expansion bus standard.

21. The computer-readable medium of claim 20, wherein the expansion bus standard is PCI Express.

22. The computer-readable medium of claim 17, further comprising program code for implementing a RAID using the non-volatile memory.

23. The computer-readable medium of claim 17, further comprising program code for receiving the second data according to a data network protocol comprising: a Fiber Channel protocol, a Serial Attached SCSI (SAS) protocol, or an Ethernet protocol.

* * * * *